Oct. 20, 1942.                F. LOHSE                    2,299,582
            FLIGHT CONTROL SYSTEM FOR MINIATURE AIRCRAFT
                    Filed June 8, 1942            2 Sheets-Sheet 2
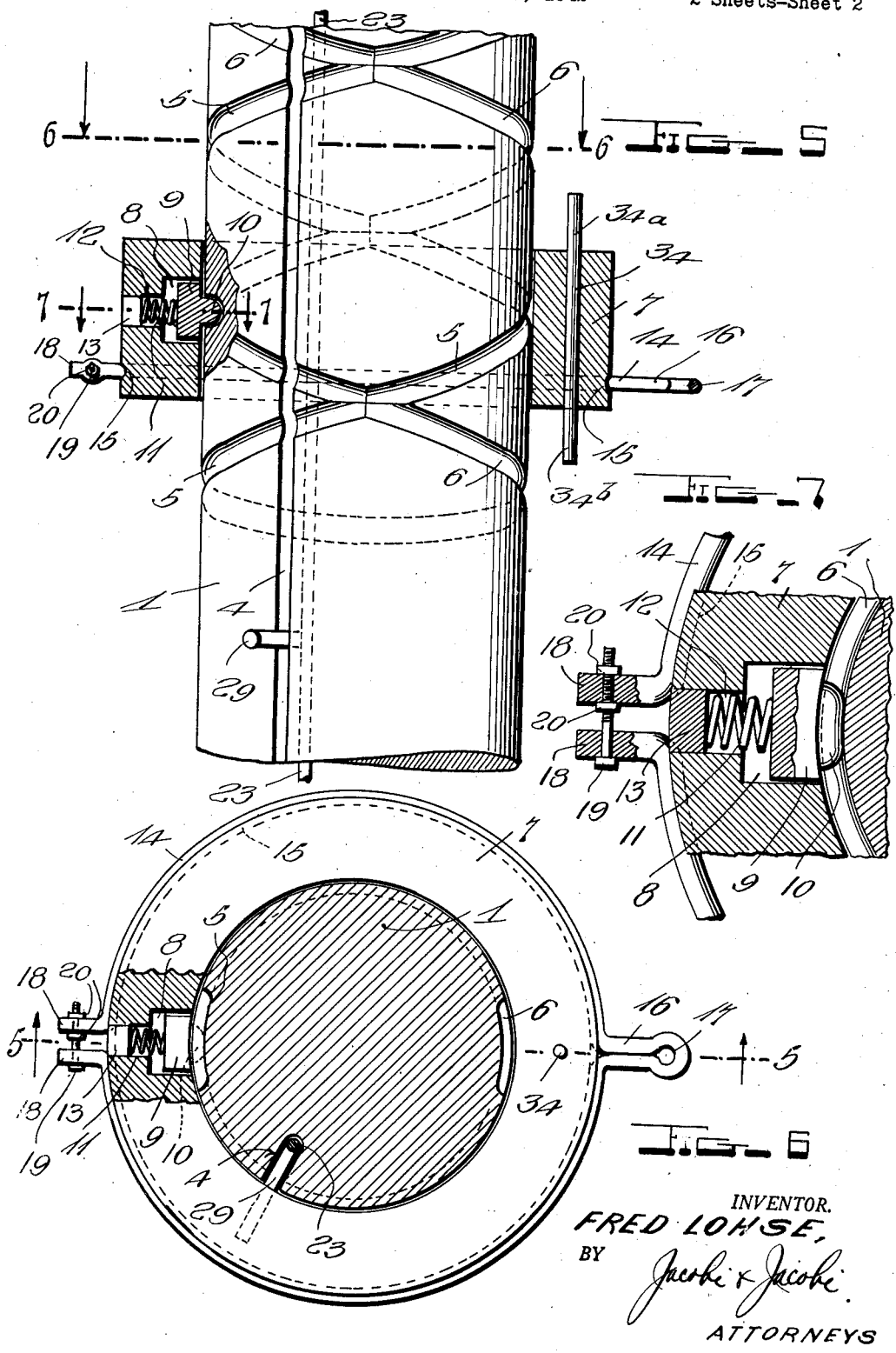
INVENTOR.
FRED LOHSE,
BY Jacobi & Jacobi
ATTORNEYS Patented Oct. 20, 1942

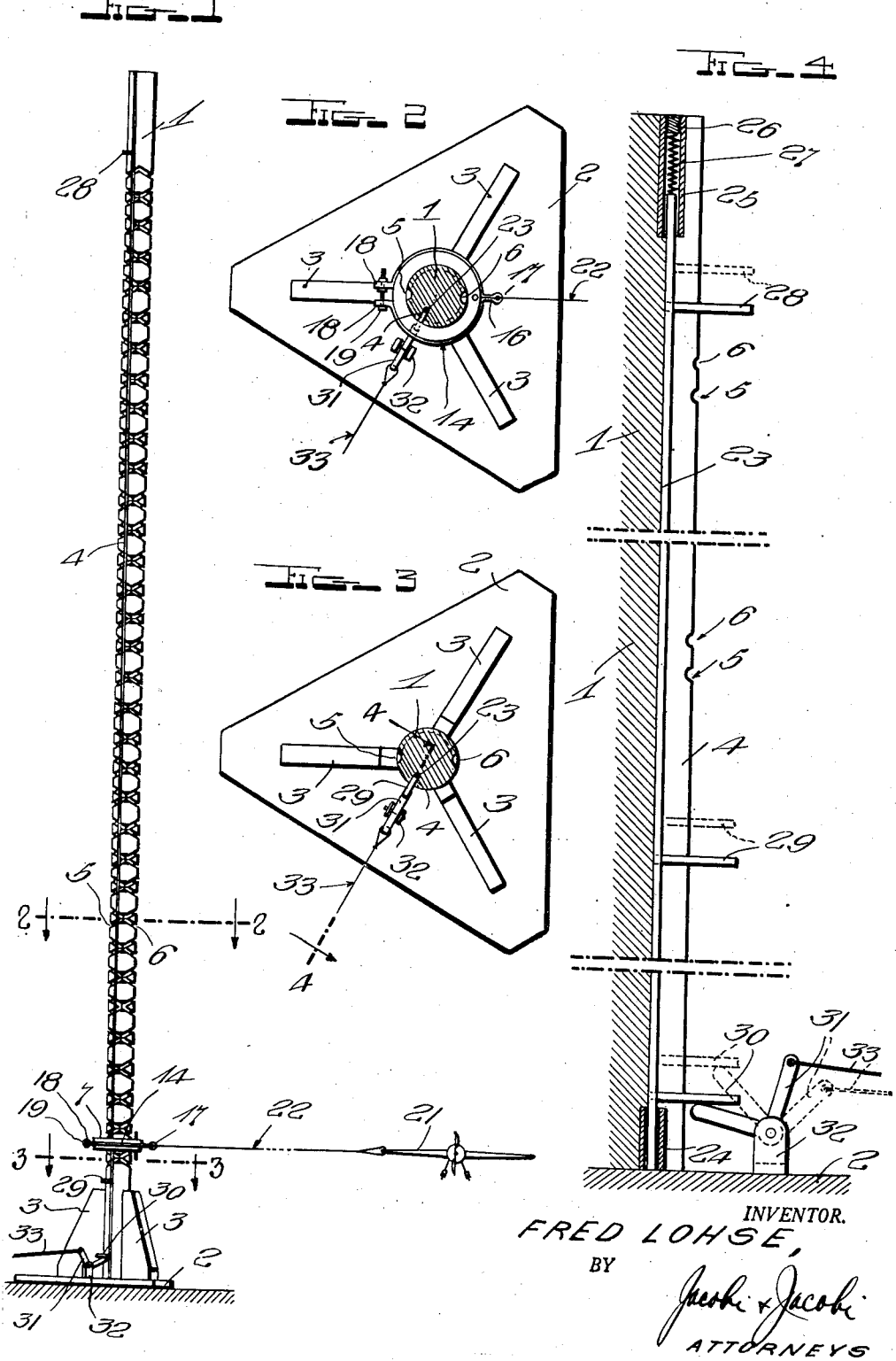

2,299,582

UNITED STATES PATENT OFFICE 2,299,582

FLIGHT CONTROL SYSTEM FOR MINIATURE AIRCRAFT

Fred Lohse, Cupertino, Calif.

Application June 9, 1942, Serial No. 446,245

9 Claims. (Cl. 272—31)

This invention relates to a flight control system for miniature aircraft of the type shown in my copending application filed July 10, 1941, Serial No. 401,842, and it is one object of the invention to provide a system of this character wherein a miniature aircraft may be operated in predetermined path in order to ascertain and test its performance in flight, this being either for amusement or for scientific testing of miniature planes built as scale models of newly developed types of planes which it is proposed to adopt for commercial or military use if the models successfully pass tests to which they are subjected.

Another object of the invention is to provide an apparatus by means of which a model plane may be caused to take off, then travel in an endless path, and finally landed upon the surface from which it took off and come to a stop under approximately normal conditions.

Another object of the invention is to provide an apparatus so constructed that, as a miniature engine-powered aircraft flies in an endless path, it first automatically gains altitude until it has reached a maximum altitude, and then automatically loses altitude until it is again at take-off altitude.

Another object of the invention is to provide an apparatus so constructed that, as an aircraft traverses its endless path, the altitude of the aircraft may be allowed automatically to vary from its minimum to its maximum in repeated uninterrupted cycles, or it may be held at will at the minimum or at the maximum altitude by the operator of the apparatus.

Another object of the invention is to provide an apparatus of such construction that expensive engine-powered true scale model aircraft, and particularly multimotored transports, flying boats or bombers, may be flown indoors with minimum crackup hazard.

Another object of the invention is to provide an apparatus of this character which is simple in construction, easy to operate and very entertaining to spectators as well as instructive when used for scientific tests of scale models of aircraft.

Another object of the invention is to provide an apparatus which may be used for advertising purposes or for playing games of chance wherein the aircraft has its motor shut off while flying over a circular path divided into sections upon any one of which the aircraft is liable to stop after landing.

Still another object of the invention resides in providing a device of this character which is simple and durable in construction, inexpensive to manufacture and very efficient in operation and application to use.

With these and numerous other objects in view, my invention consists in the novel features of construction, combination and arrangement of parts as will be hereinafter referred to and more particularly pointed out in the specification and claims.

The invention is illustrated in the accompanying drawing, wherein:

Figure 1 is a view in elevation of the assembled apparatus;

Figure 2 is a sectional view taken transversely through the standard along line 2—2 of Figure 1;

Figure 3 is a sectional view taken along line 3—3 of Figure 1;

Figure 4 is a sectional view taken vertically through the standard along line 4—4 of Figure 3;

Figure 5 is an enlarged fragmentary view showing the standard in elevation and the ring or collar in section along line 5—5 of Figure 6;

Figure 6 is a transverse sectional view taken along the line 6—6 of Figure 5, and Figure 7 is a fragmentary sectional view taken along the line 7—7 of Figure 5.

My invention makes it possible to let a miniature engine powered airplane take off directly before the spectator, to keep it flying in a closed path such as a circle, to either let is automatically increase and decrease its altitude from take-off to a maximum altitude in uninterrupted cycles or, cause the aircraft to hold its maximum or its minimum altitude, and to land the plane directly before the spectator whenever the operator wishes to do so. The miniature airplane is flown within a short distance of the spectator, and its landing can be easily and positively controlled. Exact-scale models, which are not successful flyers as a rule, can be flown with confidence by this method. Proportionally-powered exact-scale models can be flown to demonstrate differences in performance as they actually obtain in the original airplanes modeled. Scale-models of seaplanes and flying boats can also be flown by this method, using water for the landing surface. Miniature airplanes can be flown indoors by this method, making engine-powered model flying independent of weather conditions.

The standard or column 1 may be of any height and diameter desired and is circular in cross section. This column or standard is mounted in an upright position upon a base 2 where it is maintained perpendicular to the base by a suitable number of braces 3. A vertically extending groove 4 is formed in the column from the upper end to the lower end thereof and about the column are formed helical grooves 5 and 6 which extend in opposite directions about the column with their lower ends intersecting a short distance above the braces 3 and their upper ends intersecting in downwardly spaced relation to the upper end of the column. Portions of the helical grooves cross each other as shown in Figures 1 and 5 and from an inspection of these figures it will be seen that a collar mounted about the column may follow one of the helical grooves from the lower end thereof to its upper end and then follow the companion helical groove from its upper end to its lower end. Therefore, a miniature airplane may attain altitude after making a take-off and after reaching its maximum altitude slide downwardly to a landing. The vertically extending groove 4 is of appreciably greater depth than the helical groove and this groove 4 is crossed by portions of the helical groove.

A circular block or collar 7 fits loosely about the standard or column 1 and at one point about its internal periphery is formed with a pocket 8 to receive a shoe 9 carrying a lug 10. The shoe 9 is urged toward an extended position by a spring 11 mounted in the throat 12 of the pocket 8 and abuts a plug 13, filling the outer end portion of the throat. Referring particularly to Figures 5 and 7, it will be seen that the lug 10 engages in the helical groove during rotation of the block or collar about the standard and serves to cause this block or collar to move vertically along the standard either upwardly or downwardly according to which of the helical grooves it is engaged in. It should also be noted that the lug is of such length that it may readily pass across the vertical groove 4 during rotation of the block or collar and that its ends are rounded so that, as it passes across the groove 4, its ends will not catch and interrupt turning movement of the collar about the standard.

A ring 14 fits about the block or collar 7 within a circumferentially extending groove 15 located adjacent the lower edge thereof as shown in Figure 5 in the preferred construction, but it is to be understood that this groove may be located adjacent the upper edge of the collar or midway its upper and lower ends, if so desired. The ring is crimped to form an arm 16 terminating in an eye 17 at its outer end and ends of the band of metal from which the ring is formed are bent to form ears 18 which project radially from the ring and are perforated to receive a securing bolt 19. The nuts 20 of the bolt grip one of the ears between them when tightened and the ring will then be firmly held in such adjustment that, while it may turn about the collar within the groove, there will be sufficient frictional binding between the ring and walls of the groove to prevent free turning. By properly tightening the bolt 19, frictional binding between the ring and the collar will be such that when the collar is free to turn about the column or standard the ring will move with it, whereas when the collar is held stationary at its maximum or minimum altitude, the ring will turn about the collar. It will thus be seen that the miniature airplane 21, which is connected with the ring 14 by a cord or flexible wire 22 secured at one end to the eye 17 and at its other end to the tip of the inner wing, may fly in an endless circular path about the column or standard and during such movement of the air plane the ring and the collar may turn as a unit, or the ring turn about the collar when the collar is held against turning about the standard.

Turning of the collar about the standard when disposed at upper or lower ends of the helical groove is controlled through the medium of the rod 23 which extends vertically within the groove 4. The lower end of the rod is slidably received in a sleeve 24 at the lower end of the standard and the upper end portion of the rod is slidably received in another sleeve 25 mounted in the upper end portion of the standard. The upper end portion of the sleeve 25 is internally threaded to receive a plug 26 which engages the upper end of a spring 27 and places this spring under tension so that the spring urges the rod downwardly and yieldably holds the rod in the lowered position shown in Figure 4. Arms or short rods 28, 29 and 30 are carried by the rod 23 and extend radially therefrom through the slot or groove 4, with portions projecting radially from the standard. The arm 28 may be referred to as an upper stop and the arm 29 as a lower stop. The arm 30 is located close to the lower end of the standard and projects therefrom over the inner arm of a bell crank lever 31 pivotally carried by a bracket 32 mounted upon the base 2, and from an inspection of Figure 4, it will be seen that when pull is exerted upon the line 33 to turn the bell crank lever about its pivot and swing its inner arm upwardly toward the position indicated by dotted lines in Figure 4, this inner arm of the bell crank lever will act upon the lower arm 30 of rod 23 and shift the rod upwardly to move the arms 28 and 29 to higher levels. A pin 34 is mounted vertically through the collar 7 with its end portions 34a and 34b projecting above and below the collar. Under normal conditions, the collar may turn about the standard without the lower end portion 34b of the pin 34 engaging the arm 29, but when the rod 23 is shifted upwardly, the arm 29 will be moved upwardly to such position that turning of the collar about the standard will be stopped by engagement of the lower portion of the pin 34 with the arm. In like manner, the arm 28 is normally in such position that when the collar has moved upwardly along the standard to its maximum height thereon, turning of the collar about the standard will be stopped by engagement of the upper portion 34a of the pin 34 with the arm 28, but by shifting the rod 23 upwardly, the arm 28 will be moved to such position that the pin may pass under this arm and the collar then be moved downwardly along the standard instead of being held in a raised position with the miniature airplane flying at maximum altitude.

During use of this apparatus, the standard is set up in a vertical position on a miniature landing field or it can be set up indoors within a hangar or in a show window in case the apparatus is to be used for advertising purposes instead of for testing miniature scale models of airplanes, or as a toy. The cord or flexible wire 22 is passed through an opening formed in the tip of the inner wing of the airplane or through an eye carried thereby, and the motor of the airplane then started. This motor can be of such type that it will run for a predetermined length of time or there may be provided a motor control mounted near the tip of the outer wing for engagement with an adjustable member movable into and out of position to engage the motor control or switch and shut off the motor when the airplane is about to make a landing. Such an arrangement is shown in my copending application previously referred to. When the motor is started, the airplane will move about the standard in a circular path and since the lower end of the pin 34 terminates above the normal plane of the arm 29, the ring and the collar will turn as a unit. As the airplane attains flying speed, it will take off and the collar will move upwardly along the standard. If so desired, the line 33 may be pulled to shift the rod 23 upwardly and thus cause the arm 29 to engage the lower portion of the pin 34 and hold the collar stationary at the lower ends of the helical groove until the airplane has attained flying speed, at which time the bell crank lever will be released and the springs 27 will lower the rod 23 and permit the collar to turn about the standard with the ring 14 and move upwardly along the standard until it reaches its maximum altitude at upper ends of the helical grooves. When the collar reaches the upper ends of the helical grooves, the upper portion of the rod 34 will engage the arm 28 and hold the collar stationary so that the airplane may fly in a circular path about the standard at its maximum altitude. When it is desired to have the airplane spiral downwardly and glide to a landing, pull is again exerted upon the line 33 to raise the rod 23 and arm 28 will then be shifted upwardly out of engagement with the upper end portion of pin 34 and the collar may then turn with the ring and follow a spiral groove downwardly along the standard. When the collar reaches the lower end of the spiral groove, the pin 34 will again engage arm 29 and the motor will by this time have run down or it can be stopped by engagement of its control switch with an abutment which will be moved into position for engagement with the switch. The airplane will then glide to a landing upon the landing field. It will be obvious that by properly actuating the bell crank lever, the collar may continue its movement up and down along the standard during a prolonged flight of the airplane.

What is claimed is:

1. In an apparatus of the character described, a miniature aircraft, a vertical standard, a collar rotatable about the standard and shiftable vertically thereon, a ring rotatable about the collar and frictionally held against free turning about the collar, means connecting the aircraft with the ring and mounting the aircraft for movement in an endless path about the standard, means for guiding the collar vertically along the standard, and means movable into and out of position for holding the collar stationary upon the standard at predetermined altitude while the ring and the aircraft move about the collar.

2. In an apparatus of the character described, a miniature aircraft, a vertical standard, a collar rotatable about the standard and shiftable vertically thereon, a ring rotatable about the collar and frictionally held against free turning about the collar, means connecting the aircraft with the ring and mounting the aircraft for movement in an endless path about the standard, the standard being formed with helical tracks extending about the same in opposite directions with their upper and lower ends interconnected, a member carried by said collar for engaging in the tracks and shifting the collar upwardly and then downwardly along the standard as the collar turns about the standard, and means movable into and out of position for holding the collar stationary upon the standard while the ring and the aircraft move about the standard.

3. In an apparatus of the character described, a miniature aircraft, a vertical standard, a collar rotatable about the standard and shiftable vertically thereon, a ring rotatable about the collar and frictionally held against free turning about the collar, means connecting the aircraft with the ring and mounting the aircraft for movement in an endless path about the standard, the standard being formed with helical tracks extending about the same in opposite directions with their upper and lower ends interconnected, a shoe carried by said collar, a spring urging the shoe toward the standard, a lug carried by the shoe for engaging in the track and shifting the collar upwardly and then downwardly along the standard as the collar turns about the standard, and means movable into and out of position for holding the collar stationary upon the standard while the ring and the aircraft move about the standard.

4. In an apparatus of the character described, a miniature aircraft, a vertical standard, a collar rotatable about the standard and shiftable vertically thereon, a ring rotatable about the collar and frictionally held against free turning about the collar, means connecting the aircraft with the ring and mounting the aircraft for movement in an endless path about the standard, the standard being formed with helical tracks extending about the same in opposite directions with their upper and lower ends interconnected, the collar being formed with a pocket opening through its inner peripheral face, a shoe in the pocket and slidable toward an extended position, a lug carried by said shoe, a spring in the pocket urging the shoe toward its extended position and holding the lug in the tracks for following the tracks and shifting the collar upwardly and then downwardly along the standard as the collar turns about the standard, and means movable into and out of position for holding the collar stationary upon the standard while the ring and the aircraft move about the standard.

5. In an apparatus of the character described, a miniature aircraft, a vertical standard, a collar rotatable about the standard and shiftable vertically thereon, a ring rotatable about the collar and frictionally held against free turning about the collar, means connecting the aircraft with the ring and mounting the aircraft for movement in an endless path about the standard, means for guiding the collar vertically along the standard, the ring being disposed circumferentially to create predetermined frictional binding between the collar and the ring and allow movement of the ring and the aircraft about the collar when the collar is held stationary upon the standard, and means movable into and out of position for holding the collar stationary at an end of its path of vertical movement along the standard.

6. In an apparatus of the character described, a miniature aircraft, a vertical standard, a collar rotatable about the standard and shiftable vertically thereon, a ring rotatable about the collar and frictionally held against free turning about the collar, means connecting the aircraft with the ring and mounting the aircraft for movement in an endless path about the standard, means for guiding the collar vertically along the standard, the standard being formed with a vertical groove crossed by said tracks, a member shiftable vertically in said groove, abutments extending from said member out of the groove and laterally from the standard adjacent ends of the tracks, and means for shifting the said member vertically in the groove and moving the abutments into and out of position for engaging the collar and holding the collar stationary while the ring and the aircraft move about the standard.

7. In an apparatus of the character described, a miniature aircraft, a vertical standard, a collar rotatable about the standard and shiftable vertically thereon, a ring rotatable about the collar and frictionally held against free turning about the collar, means connecting the aircraft with the ring and mounting the aircraft for movement in an endless path about the standard, means for guiding the collar vertically along the standard, the standard being formed with a vertical groove crossed by said tracks, a rod shiftable vertically in the groove and normally in a lowered position, arms extending from said rod out of the groove adjacent upper and lower ends of the tracks for engaging the collar and holding the collar stationary after moving along the standard to ends of its path of travel and allowing the ring and the aircraft to move about the collar and the standard, and means for shifting the rod upwardly to vertically adjust the position of the arms.

8. In an apparatus of the character described, a miniature aircraft, a vertical standard, a collar rotatable about the standard and shiftable vertically thereon, a ring rotatable about the collar and frictionally held against free turning about the collar, means connecting the aircraft with the ring and mounting the aircraft for movement in an endless path about the standard, means for guiding the collar vertically along the standard, the standard being formed with a vertical groove crossed by said tracks, a rod shiftable vertically in the groove and normally in a lowered position, arms extending from said rod out of the groove adjacent upper and lower ends of the tracks, a pin passing vertically through the collar with end portions projecting above and below the collar, and means for shifting the rod vertically and moving its arms into and out of position for engagement by the projecting end portions of the pin to hold the collar stationary at ends of its path of travel while the ring and the aircraft move about the standard.

9. In an apparatus of the character described, a miniature aircraft, a vertical standard, a collar rotatable about the standard and shiftable vertically thereon, a ring rotatable about the collar and frictionally held against free turning about the collar, means connecting the aircraft with the ring and mounting the aircraft for movement in an endless path about the standard, means for guiding the collar vertically along the standard, the standard being formed with a vertical groove crossed by said tracks, a rod shiftable vertically in the groove and normally in a lowered position, arms extending from said rod out of the groove adjacent upper and lower ends of the tracks, a pin passing vertically through the collar with end portions projecting above and below the collar, an abutment projecting from the rod adjacent the lower end of the standard, a bell crank pivotally mounted in transverse spaced relation to the lower end of the standard and having a portion under the abutment, and means for turning the bell crank about its pivot for engaging the abutment of the rod and shifting the rod vertically and moving its arms into and out of position for engagement by the projecting end portions of the pin to hold the collar stationary at ends of its path of travel while the ring and the aircraft move about the standard.

FRED LOHSE.